(12) United States Patent
Moberg

(10) Patent No.: US 7,225,976 B1
(45) Date of Patent: *Jun. 5, 2007

(54) AIRCRAFT ANTI-THEFT AND SAFETY SYSTEM

(76) Inventor: David Moberg, 6716 Valrie La., Riverview, FL (US) 33569

( * ) Notice: Subject to any disclaimer, the term of this patent is extended or adjusted under 35 U.S.C. 154(b) by 281 days.

This patent is subject to a terminal disclaimer.

(21) Appl. No.: 10/839,553

(22) Filed: May 5, 2004

Related U.S. Application Data

(63) Continuation-in-part of application No. 10/186,002, filed on Jun. 28, 2002, now Pat. No. 6,757,596.

(51) Int. Cl.
*G06K 5/00* (2006.01)

(52) U.S. Cl. ........................ 235/380; 235/382

(58) Field of Classification Search ........... 340/945; 701/3; 307/10.5; 180/287; 235/375, 380, 235/382, 435–437, 449, 454, 462.01, 487, 235/492, 493
See application file for complete search history.

(56) References Cited

U.S. PATENT DOCUMENTS

| | | | | |
|---|---|---|---|---|
| 5,159,344 A | * | 10/1992 | Robinson et al. ............. | 342/44 |
| 5,479,162 A | * | 12/1995 | Barger et al. ................ | 340/945 |
| 5,552,789 A | * | 9/1996 | Schuermann .............. | 340/5.21 |
| 5,686,765 A | * | 11/1997 | Washington ................ | 307/10.5 |
| 5,691,697 A | * | 11/1997 | Carvalho et al. ............ | 340/544 |
| 5,845,733 A | * | 12/1998 | Wolfsen ..................... | 340/5.53 |
| 5,867,802 A | * | 2/1999 | Borza ........................ | 340/5.53 |
| 6,246,320 B1 | * | 6/2001 | Monroe ...................... | 340/506 |
| 6,573,839 B2 | * | 6/2003 | Kimmet ..................... | 340/945 |
| 6,584,383 B2 | * | 6/2003 | Pippenger ....................... | 701/3 |
| 6,757,596 B1 | * | 6/2004 | Moberg .......................... | 701/3 |
| 6,810,310 B1 | * | 10/2004 | McBain ......................... | 701/3 |
| 2003/0050745 A1 | * | 3/2003 | Orton ............................ | 701/3 |
| 2003/0052799 A1 | * | 3/2003 | Weigl ......................... | 340/945 |
| 2003/0071743 A1 | * | 4/2003 | Seah et al. .................. | 340/945 |

* cited by examiner

*Primary Examiner*—Michael G. Lee
*Assistant Examiner*—Kumiko C. Koyama
(74) *Attorney, Agent, or Firm*—Edward P. Dutkiewicz

(57) ABSTRACT

A fixed program processor having a timer relay and a comparator relay interprets, stores and compares inputted biometric data with pre-loaded biometric data and responds including activation of a vehicle's electronic systems. An electronic system interrupter allows the vehicle's electronic system to function with the interrupter maintained in the electronic systems functioning position by a signal from the processing unit thereby allowing the interrupter to be overridden by the processing unit to keep the electronic system in a functioning mode. An air pressure sensor detects the vehicle's speed and signals when speed is beyond a preset threshold. The processing unit, the input device, electronic system interrupter, air pressure sensor and a power source are electronically coupled.

1 Claim, 4 Drawing Sheets

AIRCRAFT ANTI-THEFT AND SAFETY SYSTEM

RELATED APPLICATIONS

This application is a Continuation-in-Part Application of a patent application Ser. No. 10/186,002 filed on Jun. 28, 2002 and which is now U.S. Pat. No. 6,757,596 before the Patent Office.

BACKGROUND OF THE INVENTION

1. Field of the Invention

The present invention relates to an aircraft anti-theft and safety system and more particularly pertains to preventing unauthorized personnel from starting an aircraft without both human and data code and with safety features that allow restarting following an in-flight engine stall of piston driven and turbine driven aircraft. In addition the system provides for limiting access and monitoring of those parties with access to sensitive compartments of an aircraft, such as engine compartments, electronics compartments and storage compartments. Additionally, the system provides for the transmission of the identification, and instantaneous verification of the identification of the person flying an aircraft.

2. Description of the Prior Art

The use of security systems of known designs and configurations is known in the prior art. More specifically, security systems of known designs and configurations previously devised and utilized for the purpose of precluding unauthorized entry or use through human and data information are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,867,802 to Borza discloses a biometrically secured control system for preventing the unauthorized use of a vehicle. Also, U.S. Pat. No. 5,479,162 to Barger et al discloses an aircraft anti-theft system.

While these devices fulfill their respective, particular objectives and requirements, the aforementioned patents do not describe an aircraft anti-theft system that allows for the prevention of unauthorized personnel starting an aircraft without both human and data code and with safety features that allow restarting following an in-flight engine stall.

In this respect, the aircraft anti-theft and safety system according to the present invention substantially departs from the conventional concepts and designs of the prior art, and in doing so provides an apparatus primarily developed for the purpose of preventing unauthorized personnel from starting an aircraft without both human and data code and with safety features that allow restarting following an in-flight engine stall.

Therefore, it can be appreciated that there exists a continuing need for a new and improved aircraft anti-theft system which can be used for preventing unauthorized personnel from starting or operating an aircraft without both human and data code and with safety features that allow restarting following an in-flight engine stall. In this regard, the present invention substantially fulfills this need.

SUMMARY OF THE INVENTION

In view of the foregoing disadvantages inherent in the known types of security systems of known designs and configurations now present in the prior art, the present invention provides an improved aircraft anti-theft system. As such, the general purpose of the present invention, which will be described subsequently in greater detail, is to provide a new and improved aircraft anti-theft system and method which has all the advantages of the prior art and none of the disadvantages.

To attain this, the present invention essentially comprises a starter assembly. The starter assembly is electronically coupled to an aircraft engine having both an enabled state and a disabled state. The starter assembly further includes a starter solenoid. An identity/authorization reader is next provided. The reader is adapted to collect definable human characteristics and authorization data from a potential user prior to starting an aircraft. The reader is also adapted to compare inputted data with stored user and authorization data. The definable human characteristic includes, but is not limited to, authorization data being stored on various means. The means of storage includes, but is not limited to magnetic strip cards, passwords, access codes and chips. Next provided is an air pressure sensor. The air pressure sensor is adapted to signal if the aircraft is in motion at a speed beyond a preset threshold. The air pressure sensor includes a pitot or air collecting tube or source attached to the aircraft. The air pressure sensor also includes a relay switch.

A power source is next provided. The power source is adapted to provide power to the system. The power source includes a power switch. Finally, a processing unit is provided. The processing unit is comprised of a timer relay including a pair of switches, a processor having memory and data retrieval capabilities. The processing unit further has an inductor. The processing unit also includes a pair of relay switches. The processing unit is electrically coupled to the starter assembly, identity/authorization reader and air pressure sensor and power source. The processor unit is configured to put the starter assembly or start circuit of bleed air starter, in the enabled state upon receipt of the authorized identity and authorization reader input. In this manner, the identity is authorized, the identity/authorization reader returns the aircraft back to normal starting configuration, aircraft is activated, and the identity/authorization reader is inactivated. When the air pressure sensor is activated by the aircraft exceeding a threshold speed the starter assembly remains in the enabled state. In this manner, assurance is provided that while in-flight the aircraft can be restarted without having to activate the identity/authorization reader. In this case there would be a separate "reactivation" switch" that would activate the starter system without going through the identity/authorization data input sequence. Only when the aircraft master switch has been de-energized will the processor unit require the activation of identity and authorization reader before the starter assembly will again be put into the enabled state.

In addition the aircraft safety system would include the electronic locking of all compartments which housed sensitive equipment, such as electronics lockers or engine compartments. Access to such sensitive compartments could only be accomplished if a serviceman or user would identify themselves through the identification/authorization device. They would, in turn, be logged in and all compartments that were opened would be recorded. The record of access would, in turn, be available to the pilot and the aircraft control tower via transponder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved aircraft anti-theft system which has all of the advantages of the prior art security systems of known designs and configurations and none of the disadvantages.

It is another object of the present invention to provide a new and improved aircraft anti-theft system which may be easily and efficiently manufactured and marketed.

It is further an object of the present invention to provide a new and improved aircraft anti-theft system which is of durable and reliable construction.

An even further object of the present invention is to provide a new and improved aircraft anti-theft system which is susceptible of a low cost of manufacture with regard to both materials and labor, and which accordingly is then susceptible of low prices of sale to the consuming public, thereby making such aircraft anti-theft system economically available to the buying public.

Even still another object of the present invention is to provide an aircraft anti-theft system for preventing unauthorized personnel from starting an aircraft without both human and data code and with safety features that allow restarting following an in-flight engine stall.

Lastly, it is an object of the present invention to provide a new and improved fixed program processor having an associated timer relay and a comparator relay which interprets, stores and compares inputted biometric data with pre-loaded biometric data and responds including activation of a vehicle's electronic systems. An electronic system interrupter allows the vehicle's electronic system to function with the interrupter maintained in the electronic system's functioning position by a signal from the processor thereby allowing the interrupter to be overridden by the processor to keep the electronic system in a functioning mode. An air pressure sensor detects the vehicle's speed and signals when speed is beyond a preset threshold. The processor and processing unit, the input device, electronic system interrupter, air pressure sensor and a power source are electronically coupled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of an aircraft panel and a wing portion with coupling there between.

The same reference numerals refer to the same parts throughout the various Figures.

DESCRIPTION OF THE PREFERRED EMBODIMENT

Figure 1:
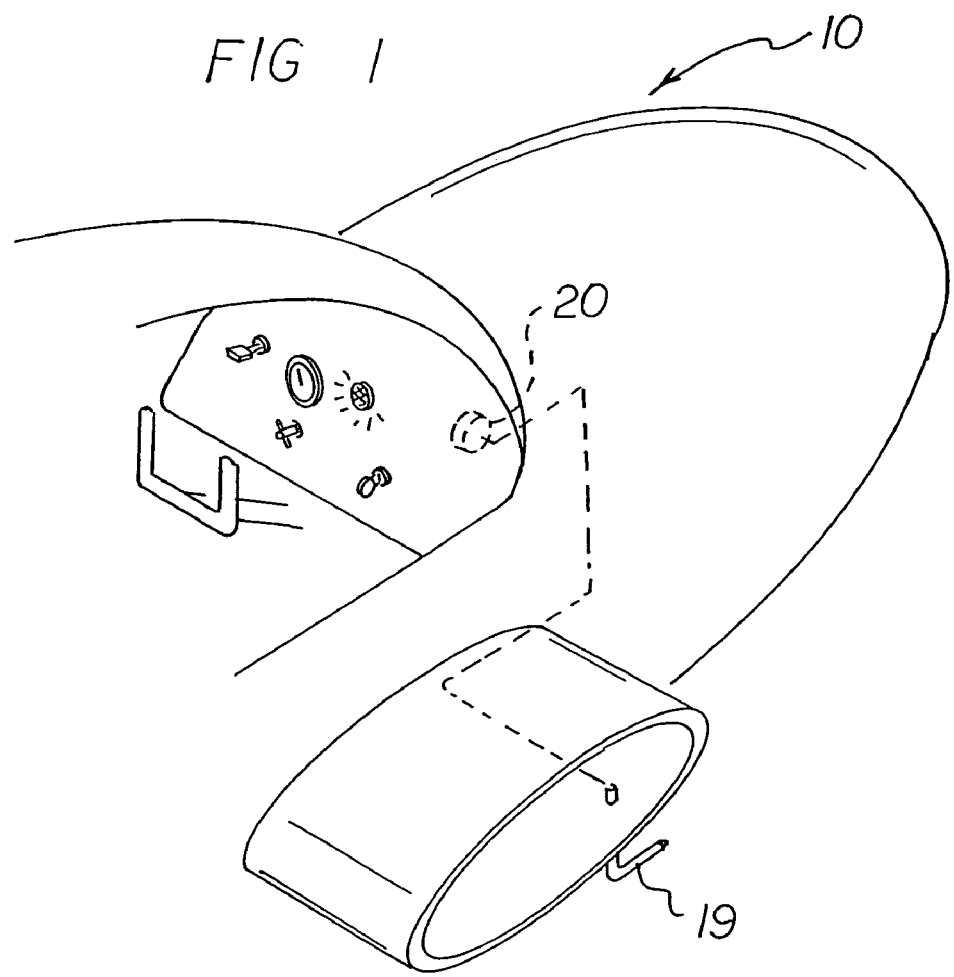

With reference now to the drawings, and in particular to FIG. 1 thereof, the preferred embodiment of the new and improved aircraft anti-theft system embodying the principles and concepts of the present invention and generally designated by the reference numeral 10 will be described.

The present invention, the aircraft anti-theft system 10 is comprised of a plurality of components. Such components in their broadest context include a biometric data input device such as a finger print reader or retinal scanner, a fixed program processor, an electronic system interrupter, an air pressure sensor, a power source, and electronic coupling. Also included would be a processor to receive information, store information and transmit information to the pilot and the air traffic controller. Such components are individually configured and correlated with respect to each other so as to attain the desired objective.

First provided is a starter assembly 12 having a starter switch 13. The starter assembly is coupled to an aircraft engine and has both an enabled state and a disabled state. The starter assembly further includes a starter solenoid 14.

An identity/authorization reader 16 is next provided. The reader is configured to collect definable human characteristics and authorization data from a potential user prior to starting an aircraft. The reader, or data input device, is also configured to compare inputted data with stored user and authorization data. The definable human characteristic includes, but is not limited to, authorization data being stored on various means and is selected from the class of biometric data including fingerprints, proximity cards that contain the template of a user's fingerprint, finger images, retinal images, retinal scans, and numerical sequences entered by a fingertip activated input board 15 of the data input device. The storage means includes, but is not limited to, magnetic strip cards, passwords, access codes, proximity cards and chips.

Next provided is an air pressure sensor 18. The air pressure sensor is configured to signal if the aircraft is in motion at a speed beyond a preset threshold. The air pressure sensor includes a pitot or air collecting tube or source 19 attached to the aircraft. The air pressure sensor also includes a relay switch 20.

A power source 22 is next provided. The power source is adapted to provide power to the system. The power source includes a power switch 24.

Finally, a processing unit 27 is provided. The processing unit is comprised of a timer relay 28, a double pole double throw switch, including a pair of separate switches 30, 32. The processing unit further has an inductor 34. The processing unit also has a comparator relay 36 which includes a pair of relay switches 38, 40. The processing unit also includes a processor 26 having a memory and the capability of retrieving and sending information.

The processing unit is electronically coupled to the starter assembly, identity/authorization reader and air pressure sensor and power source by such a means such as hard wiring, infra red signal or radio transmission signal. The processor unit is configured to put the starter assembly in the enabled state upon receipt of the authorized identity and authorization reader input. In this manner, once the identity is authorized, the identity/authorization reader returns the aircraft back to normal starting configuration, the aircraft is activated, and the identity/authorization reader is inactivated as to the starting process.

The identity/authorization reader is not, however, deactivated in regards to the processor which may be activated from a signal from an air traffic controller so as to request the identity of the operator of an aircraft. The signal from the air traffic controller would prompt the pilot or user to input identification data, even while the aircraft is underway. In this manner a pilot may verify to the air traffic controller, via the transponder 17, that he is operating the aircraft. If the pilot is prompted to confirm his operation of the aircraft, and he fails to do so, or is unable to do so, then the air traffic controller will be notified that a problem may exist on that aircraft, such as in the case of aircraft hijacking.

The aircraft may also be equipped with electronically bolted compartments, such as engine compartments and electrical compartments. The electronic bolts 21 would be interfaced with the processor so that the processor would record identification or authorization data as to each specific compartment and the identity of the person accessing that compartment. This information would be stored in the processor and would be available for access by the pilot or the air traffic controller via the aircraft transponder. The processor may also provide an alert to the pilot if a compartment has been opened, and which compartment has been opened since the last engine start-up.

In the case of aircraft system failure, or when the pilot or air traffic controller wishes to know who opened which compartments of the aircraft, the processor will send the information as to which compartment was opened, when it was opened, and by whom.

When the air pressure sensor is activated by the aircraft exceeding a threshold speed the starter assembly remains in the enabled state. In this manner, assurance is provided that while in-flight the aircraft can be restarted without having to activate the identity/authorization reader. In this case the starter could be activated without going through the identity/authorization data input sequence. Only when the aircraft master switch has been de-energized will the processor unit require the activation of identity and authorization reader before the starter assembly will again be put into the enabled state.

Figure 2:
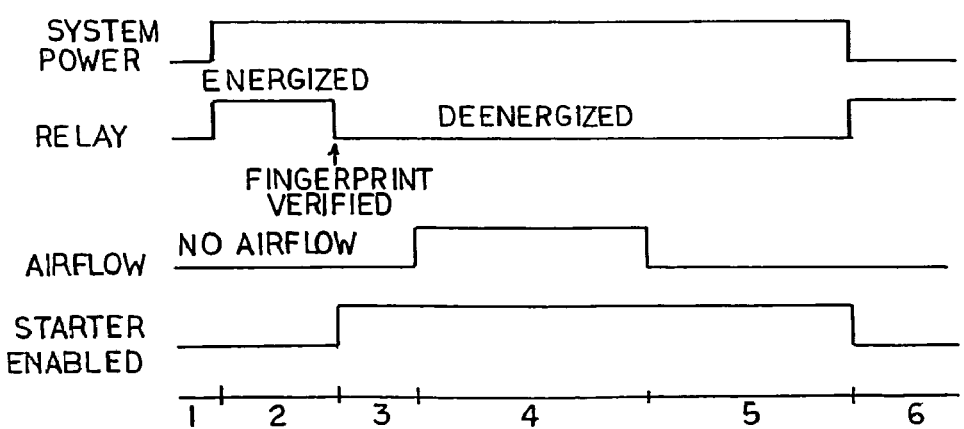
FIG. 2 is a schematic illustration of a timing diagram operable in accordance with the principles of the present invention.

A perspective illustration of the preferred embodiment of the invention is shown in FIG. 1. FIG. 2 is an excitation diagram correlating to the various components during the various stages of activation. Region 1 shows when the power to the aircraft is off and none of the components are activated. Region 2 shows an aircraft with the power enabled, but the starter assembly is in the disabled state. Region 3 shows when a proper user input is given to the identity/authorization reader. The identity/authorization reader circuitry normally puts out an energized signal until input data is authorized at which time it puts out a de-energized signal which enables the starter assembly. During this time the starter assembly can start the engines which increases the speed of the aircraft. During Region 4, the aircraft reaches a threshold air speed and the air pressure sensor maintains the starter assembly in the enabled state.

In Region 5 the air speed has dropped below the threshold of the pressure sensor, the relay will remain energized until the main power supply has been interrupted. The relay will continue to hold both switches closed for normal aircraft operation. This acts as a safety precaution against in-flight engine stall situations. Region 6 shows the power has been disconnected and values reset. When the starter switch is pressed, the starter solenoid is not enabled because switch 40 is open and switch 32 is open. It should be understood to one skilled in the art that the identity/authorization reader is active at all times in regard to memory and transmittal of data, including pilot identity and compartment access. The reader and the processor cannot be deactivated.

Figure 3:
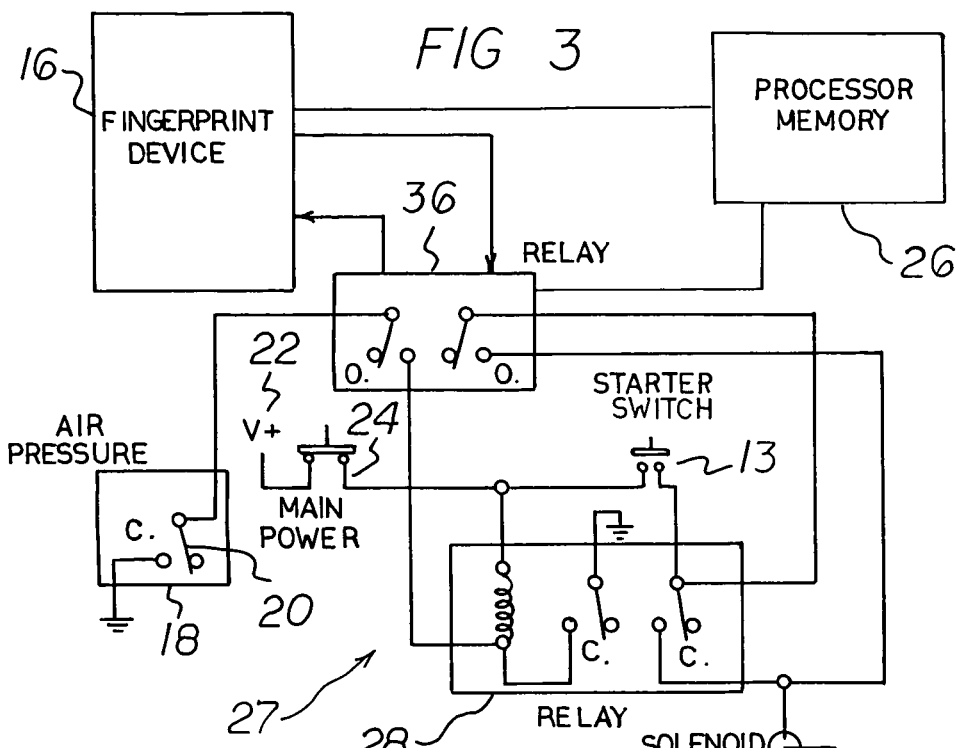
FIGS. 3 through 6 are electrical schematics illustrating the relationship between the aircraft and the anti-theft components in various operational states.

A schematic diagram is provided in FIG. 3. The relay positions are shown when the system has power applied, the aircraft is not in flight, and the identity and authorization reader has not been properly activated with regards to the starter system.

Figure 4:
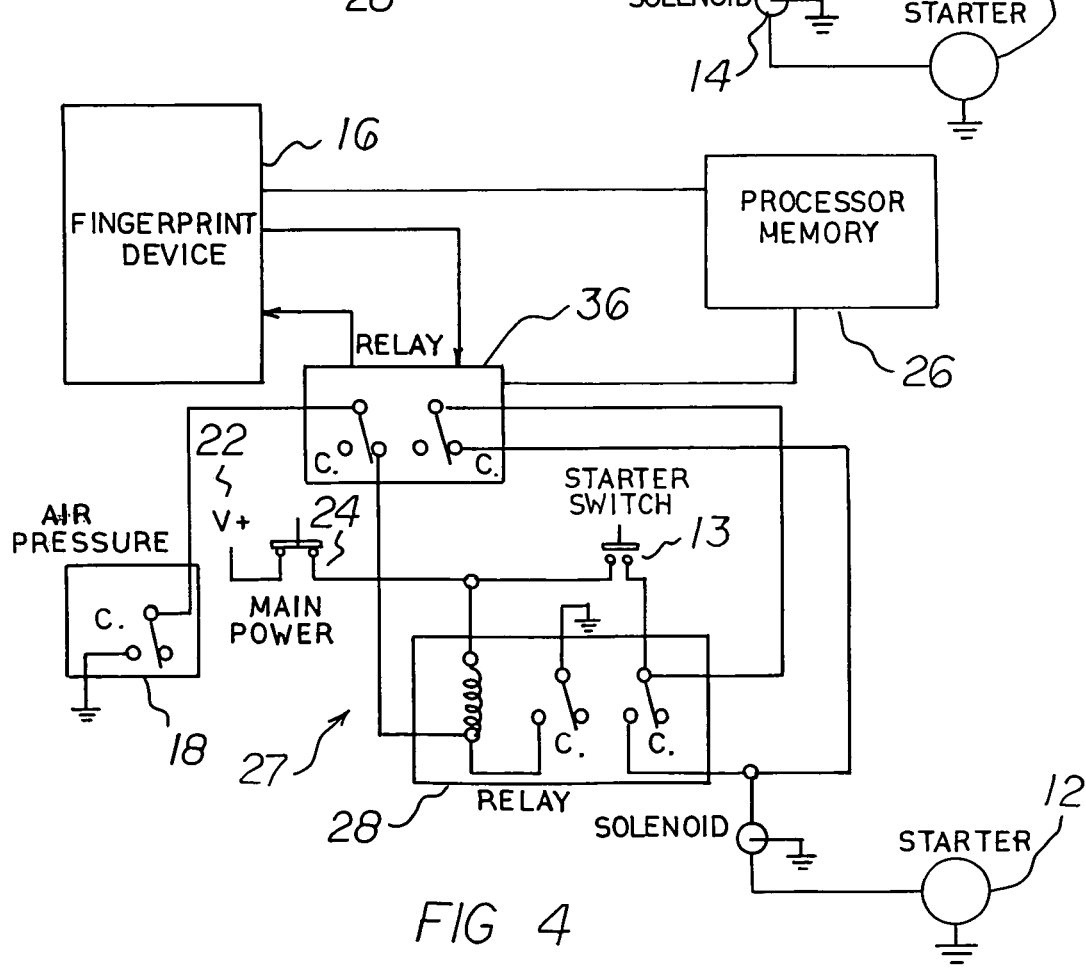

In the schematic diagram of FIG. 4, the relay positions are shown when the system has no power applied.

Figure 5:
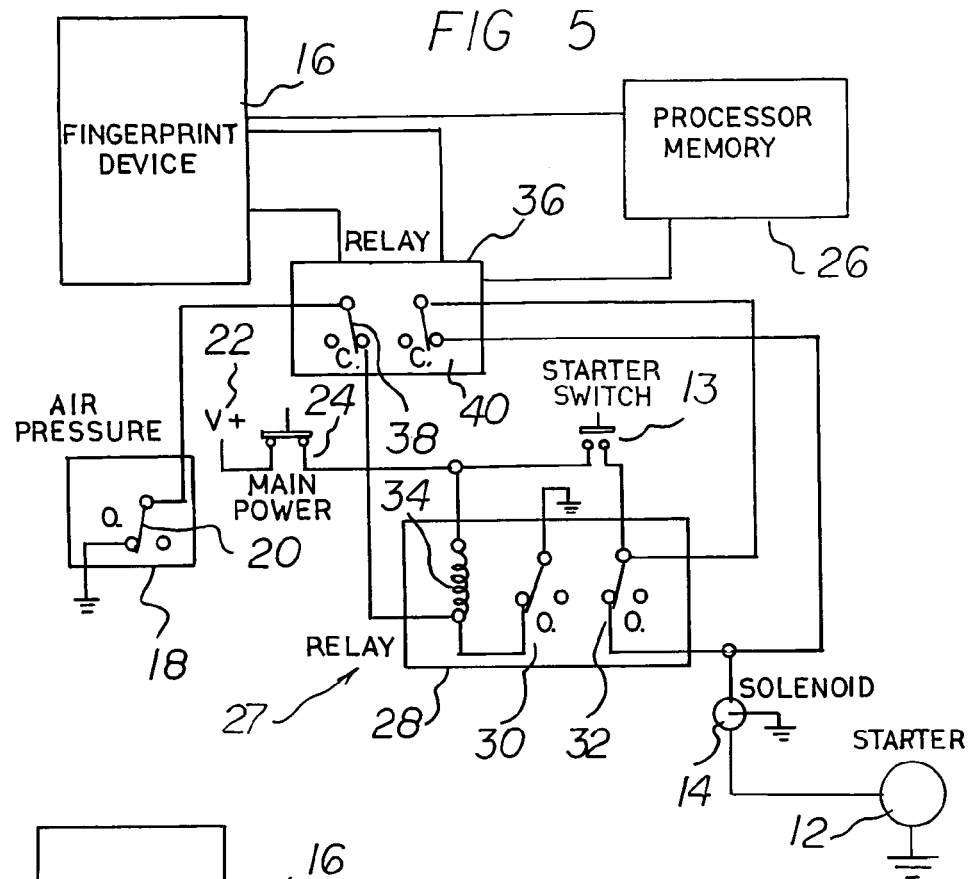

In the schematic diagram of FIG. 5, the relay positions when the system is in-flight are shown. The identity and authorization reader has verified the user. Once the aircraft has achieved the threshold velocity, the air pressure sensor will provide a ground, the previously energized relay 34 will remove the starter assembly energizing the de-energizing circuit through switch 40 creating a redundant condition enabling the starter solenoid. This provides independent redundancy to protect the starer in case switch 40 fails.

Figure 6:
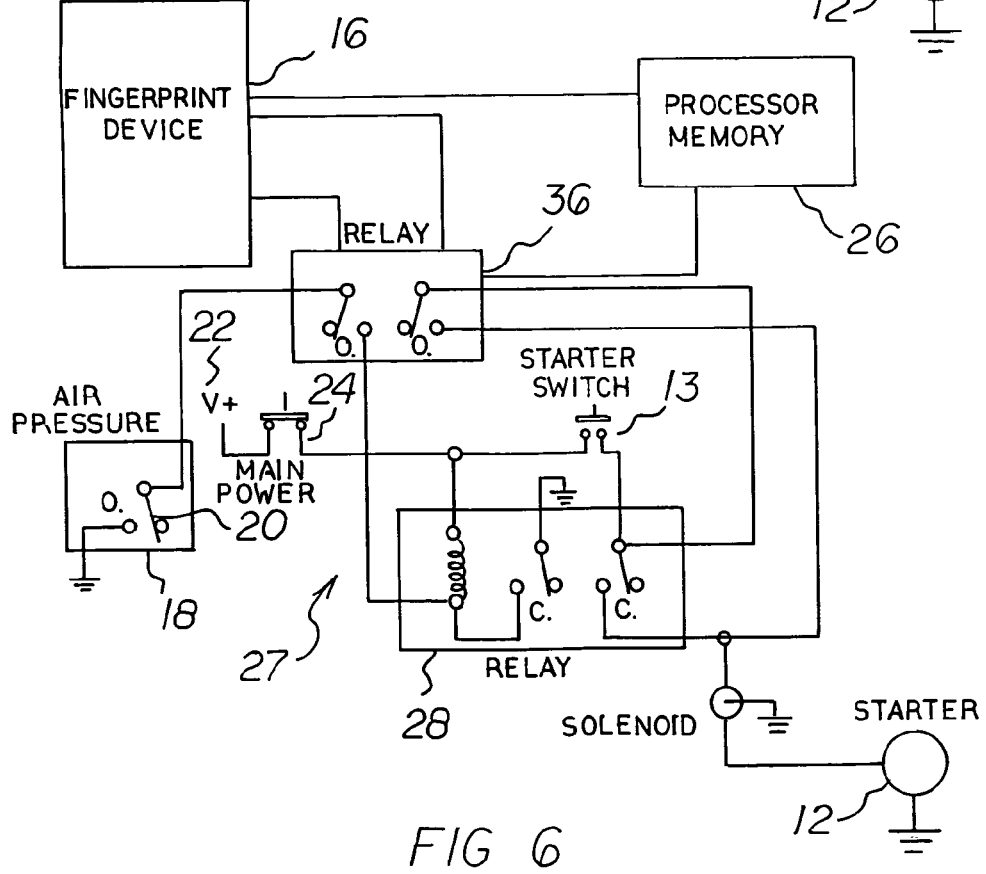
Figure 7:
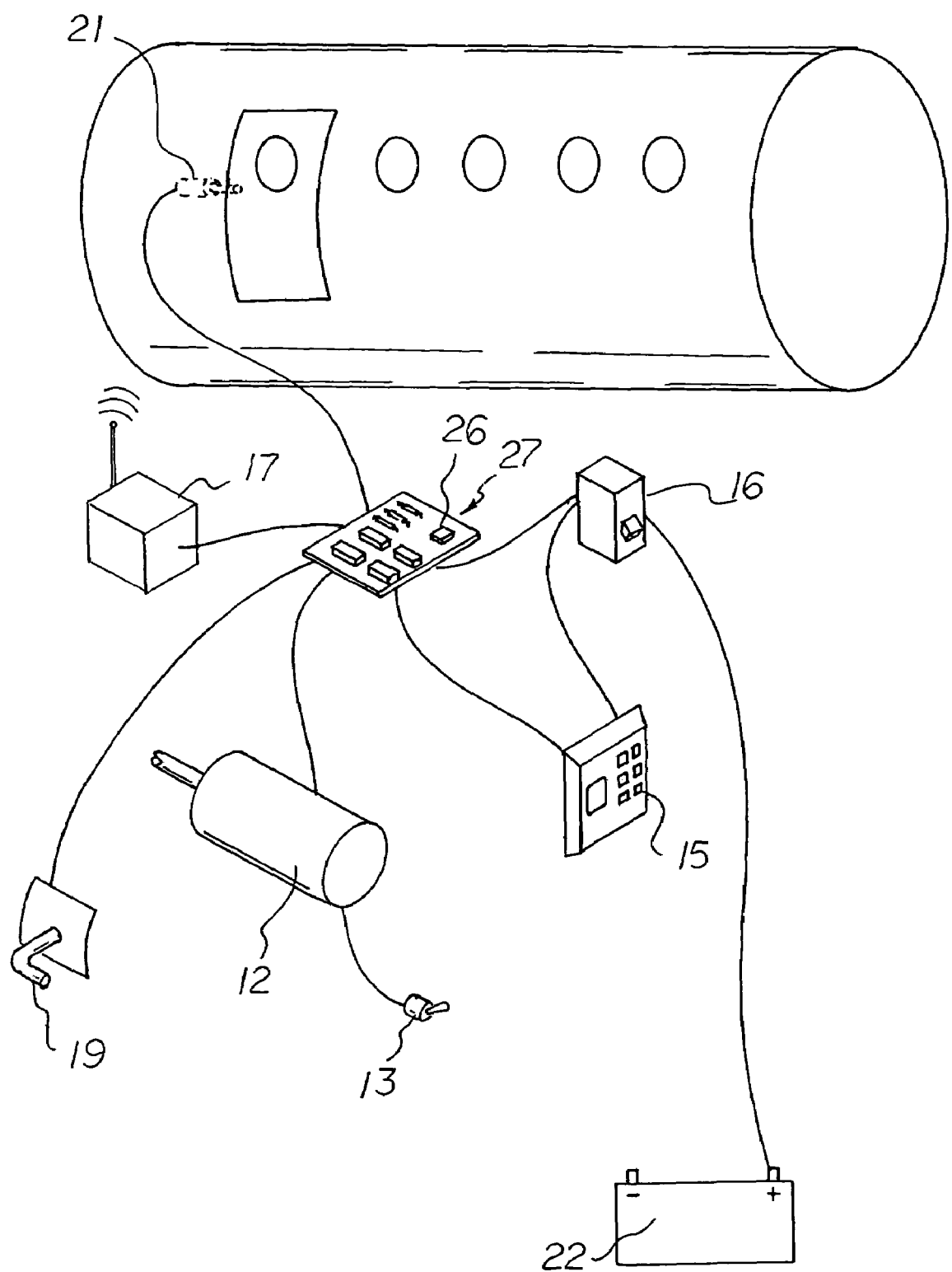
FIG. 7 is a view of the components of the system.

In the schematic diagram of FIG. 6, the relay positions are shown after the identity/authorization reader has not been properly activated and the aircraft is not in flight. The starter assembly cannot be enabled due to switch 32 and 40 being open, such as when the aircraft is being maintained. Access to the compartments for such maintenance is obtained by the user inputting his or her identification data to authorize entry into the electronically locked compartments.

The aircraft anti-theft system of the present invention is a biometric aircraft security device which includes a security technology that utilizes a physical human characteristic, such as fingerprint, voice print, retinal or iris scan. This invention provides a security system and apparatus for eliminating the possibility of the theft of an aircraft. The system includes both an access code input device and a biometric reader, which is connected to a starter motor interconnect kit, which prohibits an engine of the aircraft from starting.

The biometric reader functions to positively identify and check the authorization of the user or pilot of an aircraft prior to starting the aircraft. The system compares a biometric template of an individual with that individual to verify it is one and the same person. If both code and biometric verification is not confirmed, the airplane will not start.

During flight an air traffic controller can request the re-identification of the operator of the aircraft. If such identification is not sent via the transponder, the air traffic controller may notify authorities that the aircraft may be being operated by someone other than the original pilot.

The system would provide a permanent up-to-the-second log of all persons entering the compartments of an aircraft. The log would be available to the pilot as well as to the air traffic controller. The system may also alert the pilot if a sensitive compartment was opened during the time between last operation and start-up. The system could also restrict access to some sensitive compartments.

It is understood that one skilled in the art would be able to couple the output of the processor to a mobile or on-board computer and download the information therein, including generating printable lists of authorization procedures and compartment access.

The biometric security device is positioned and installed in an aircraft that prohibits the main power supply of that aircraft from being transmitted to the starting system unless authorized verification of the individual is guaranteed by using a security code and comparing the biometric template with the template of the user. Once verification is compared at the biometric device and verification of the user is confirmed, the main power is activated allowing the authorized person to start the aircraft. Once the power in the aircraft has been activated, the biometric device is rendered inactive in regards to the starting sequence of the aircraft, through internal circuitry and a fail-safe mechanism. The biometric device does remain active, however, in regards to determining user identification and notification of the air traffic controller if identification is requested and identification is not provided, or the improper identification is provided.

This fail-safe mechanism is activated by air pressure during the aircraft's takeoff roll. Once the aircraft reaches the preset speed, an air speed switch provides an alternative power source to the starter assembly until the airplane has safely landed and drops below the preset airspeed. The air switch device is used to ensure that the system does not impose a flight hazard by preventing in-flight engine restarts. This device will make it impossible for the biometric device to interfere in any way with the flight. In addition to the fail-safe mechanism, there is a delay timer in the circuit that allows for short drops in air flow that may be experienced at some stage in training flights, such as during aircraft stall maneuvers. This delay switch will allow the airspeed to drop below a certain amount for a predetermined number of seconds and then return to normal operation if this time is not used up. This gives the system three safeguards against interfering with the normal use of the aircraft, as designed and built by the manufacturer.

Operation of the fingerprint reader begins when an authorized individual enters the aircraft. The individual positions himself in front of the fingerprint reader and turns the master switch to the on position. After turning on the master switch two separate processes take place.

Process 1. The fingerprint reader receives power from the main aircraft battery. Once power is received at the fingerprint reader the reader activates an initializing sequence of events. This sequence consists of checking the processor board firmware, a simple device test, and testing the communication between the processor board and the fingerprint reader scanning head and its memory board. When checking the firmware, the fingerprint reader's red and green LED's flash repeatedly; then the fingerprint reader's self test initializes the scanner head, the scanner head flashes a red light on and then turns off. The testing of the electronic circuitry of the fingerprint reader is indicated by three flashes of the green LED approximately one second apart, the scanner head flashes the red light again, and if all circuits are operating properly, the green LED lights for approximately 2 seconds. Another 10 seconds later, if there is a master user enrolled in the fingerprint reader, the green LED lights again and remains on for 3 seconds.

Process 2. Simultaneously an independent relay board also receives power from the aircraft battery. The processor on the relay board engages the relays. The contacts of the relays which were in the N/C position are now switched to N/O. This disconnects the power to the starter solenoid. The starter switch still has power, but since the power to the starter solenoid is disconnected, the start sequence cannot operate.

With the fingerprint reader and the relay board initialized, the relay board now transmits a signal to the fingerprint reader that flashes the red LED indicating that the relays are engaged. It is at this time that the system is ready and waiting for an authorized fingerprint to be scanned. The operator activates the reader head by depressing a PIN number on a keypad located on the front of the fingerprint reader. A red light flashes on the scanner head and the operator places a finger on the scanner head. If the operator is an authorized user of the aircraft, a minutiae comparison takes place between the operator's scanned fingerprint image and a previously enrolled image.

If the match is successful, the green LED will light, and the fingerprint reader transmits the proper command to the relay board. The processor on the relay board receives the command and disengages the relays. The relay board is now disarmed. Simultaneously the fingerprint reader disengages and becomes dormant. The relays on the relay board, now in the disarmed state, revert back to the N/C position allowing power to reach the starter solenoid. This now allows the starter switch to initiate the starter solenoid and the aircraft can now be operated.

The backup safety system for this device is an airflow switch attached to a relay. At rest, the airflow switch is in the N/O (normally open) position and is activated when pressure is received into the airflow intake tube. In its normally opened position, the airflow switch cannot activate the safety relay. The air speed switch is a normally open switch. It closes with detected air speed. The switch then provides power to a relay with a magnetic relay to hold that relay in the closed position. Once the relay has power, the magnetic portion of the relay draws power through the master switch. Only when the master power is shut down will the relay be de-energized.

The system of the present invention is not programmable by the user. The system merely accepts or rejects the input from the user in determining whether to allow the operation of the vehicle. A modification or reprogramming of the system may only be done by the manufacturer, authorized service technician, or system administrator. Modification or reprogramming may not be done by the user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aircraft anti-theft and safety system for preventing unauthorized personnel from starting an aircraft without both human and data code and with safety features that allow restarting following an in-flight engine stall comprising, in combination:

a starter assembly being coupled to an aircraft engine having both an enabled state and a disabled state the starter assembly further including a starter solenoid;

an identity authorization reader collects definable human characteristic data and collects authorization data from a potential user prior to starting an aircraft, the reader compares said collected authorization data with stored user and authorization data, authorization data including at least one datum in the class of data that includes numerical codes, bar codes, magnetic strip data, alphanumeric codes, the reader also compares said collected human characteristic data with stored user human characteristic data, human characteristic including at least one datum in the class of data that includes finger print data and iris scan data and retinal scan data, the authorization data being stored on various storage means included in the class of storage means that includes magnetic strip cards, passwords, access codes and chips;

an air pressure sensor signals aircraft motion beyond a preset threshold, including a pitot or air collecting tube or source attached to the aircraft, the sensor being operatively coupled to an electronic circuit, the circuit including a relay switch;

a power source provides power to the system, including a power switch; and a processing unit comprised of a timer relay, the timer relay including a pair of switches, the processing unit also comprising an inductor and a comparator relay with the comparator relay having a pair of relay switches and a processor having a memory, said processing unit being electrically coupled to the starter assembly and said identity authorization reader and said air pressure sensor and said power source, with the processing unit puts the starter assembly in an enable state upon receipt of the authorized identity and authorization reader input.

* * * * *